United States Patent
Lee et al.

(10) Patent No.: US 11,676,415 B2
(45) Date of Patent: Jun. 13, 2023

(54) SENSING DEVICE CAPABLE OF IMPROVING SENSING EFFECT THEREOF

(71) Applicant: InnoLux Corporation, Miao-Li County (TW)

(72) Inventors: Te-Yu Lee, Miao-Li County (TW); Hui-Ching Yang, Miao-Li County (TW); Yang-Jui Huang, Miao-Li County (TW); Ya-Li Tsai, Miao-Li County (TW); Ya-Hsiang Tai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/688,951

(22) Filed: Mar. 8, 2022

(65) Prior Publication Data
US 2022/0327855 A1    Oct. 13, 2022

(30) Foreign Application Priority Data

Apr. 9, 2021    (CN) .......................... 202110381121.5

(51) Int. Cl.
G06V 40/13    (2022.01)

(52) U.S. Cl.
CPC .............................. *G06V 40/1306* (2022.01)

(58) Field of Classification Search
CPC .................................................. G06V 40/1306
See application file for complete search history.

(56) References Cited

U.S. PATENT DOCUMENTS

| 10,033,952 B2 | 7/2018 | Ohmaru | |
|---|---|---|---|
| 2018/0114049 A1* | 4/2018 | Chen | .................. G06V 40/1394 |
| 2021/0192168 A1* | 6/2021 | Chang | ................ G06V 40/1306 |

FOREIGN PATENT DOCUMENTS

| CN | 210327778 U | 4/2020 |
|---|---|---|
| CN | 111741240 A | 10/2020 |
| TW | 201719874 A | 6/2017 |
| TW | 201843572 A | 12/2018 |

OTHER PUBLICATIONS

Chinese language office action dated Aug. 29, 2022, issued in application No. TW 111111036.

* cited by examiner

*Primary Examiner* — Premal R Patel
(74) *Attorney, Agent, or Firm* — McClure, Qualey & Rodack, LLP

(57) ABSTRACT

A sensing device includes a sensing circuit, a conductive line, and a sampling circuit. The conductive line is electrically connected to the sensing circuit. The sampling circuit is electrically connected to the conductive line. The sampling circuit includes a capacitor, a first thin film transistor, and a second thin film transistor. The first terminal of the first thin film transistor is electrically connected to the first terminal of the capacitor. The first terminal of the second thin film transistor is electrically connected to the second terminal of the capacitor. The second terminal of the first thin film transistor is electrically connected to the conductive line. The second terminal of the second thin film transistor is electrically connected to the ground terminal.

19 Claims, 7 Drawing Sheets

SENSING DEVICE CAPABLE OF IMPROVING SENSING EFFECT THEREOF

CROSS REFERENCE TO RELATED APPLICATIONS

This application claims priority of China Patent Application No. 202110381121.5, filed on Apr. 9, 2021, the entirety of which is incorporated by reference herein.

BACKGROUND OF THE DISCLOSURE

Field of the Disclosure

The disclosure relates to a sensing device, and in particular, to a sensing device capable of improving sensing effect thereof.

Description of the Related Art

Conventional sensing devices use the characteristics of the transistor that make them capable of amplifying a signal to amplify a sensed signal before outputting it, so as to obtain a larger output range. However, a transistor often uses a process to generate a change in the characteristic parameters due to environmental factors, wherein the drifting of a threshold voltage of the transistor may cause the output voltage to generate an error, causing the output voltages to be different under the same signal intensity. Also, the read signal generates an unexpected difference. Therefore, a new design for a circuit structure is needed to improve the problem described above.

BRIEF SUMMARY OF THE DISCLOSURE

An embodiment of the disclosure provides a sensing device, which includes a sensing circuit, a conductive line, and a sampling circuit. The conductive line is electrically connected to the sensing circuit. The sampling circuit is electrically connected to the conductive line. The sampling circuit includes a capacitor, a first thin film transistor and a second thin film transistor. The first terminal of the first thin film transistor is electrically connected to the first terminal of the capacitor. The first terminal of the second thin film transistor is electrically connected to the second terminal of the capacitor. The second terminal of the first thin film transistor is electrically connected to the conductive line. The second terminal of the second thin film transistor is electrically connected to the ground terminal.

BRIEF DESCRIPTION OF THE DRAWINGS

The disclosure can be fully understood by reading the subsequent detailed description and examples with references made to the accompanying drawings, wherein.

DETAILED DESCRIPTION OF THE DISCLOSURE

Figure 1A:
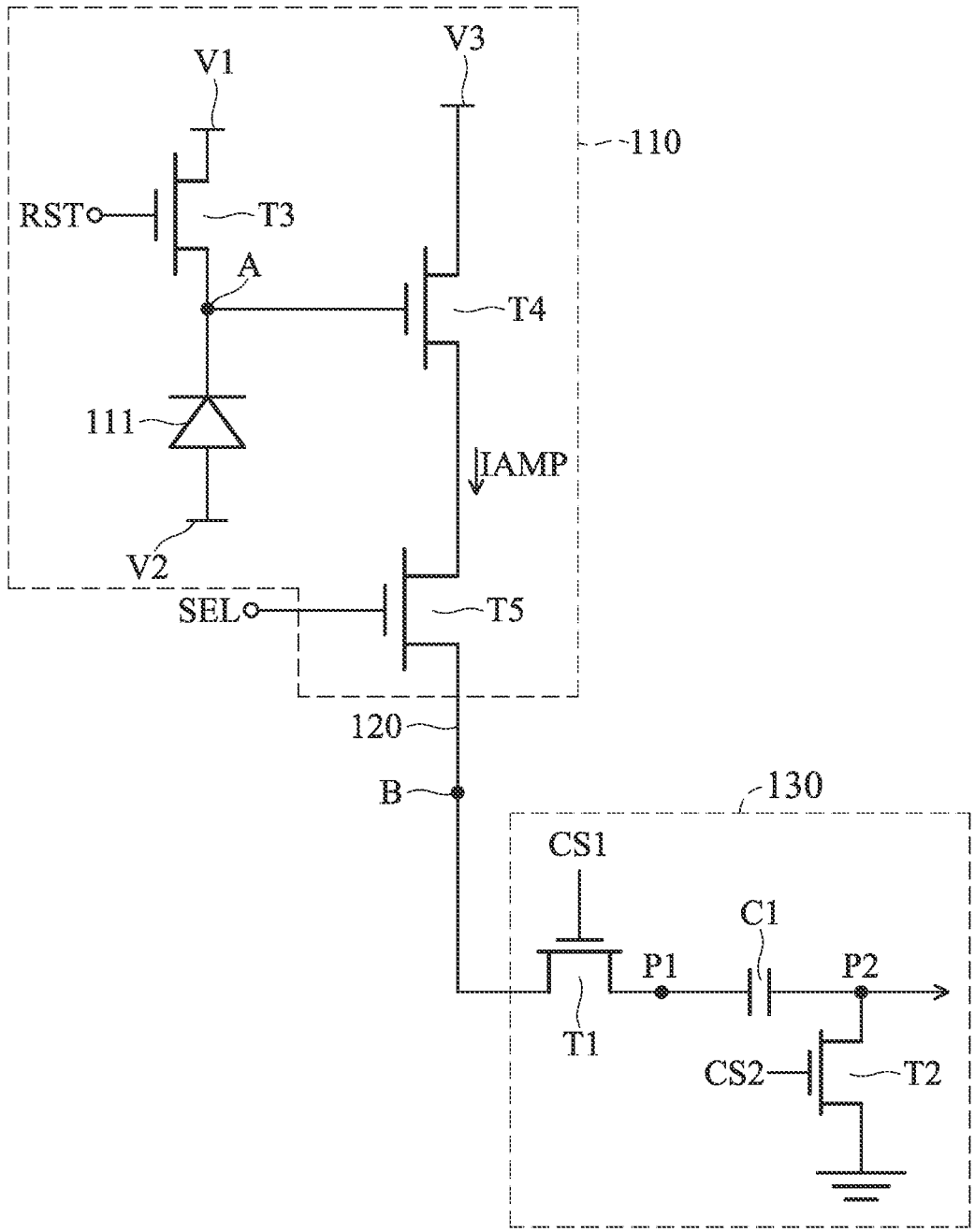
FIG. 1A is a schematic view of a sensing device according to an embodiment of the disclosure.

In order to make objects, features and advantages of the disclosure more obvious and easily understood, the embodiments are described below, and the detailed description is made in conjunction with the drawings. In order to help the reader to understand the drawings, the multiple drawings in the disclosure may merely depict a part of the entire device, and the specific components in the drawing are not drawn to scale.

The specification of the disclosure provides various embodiments to illustrate the technical features of the various embodiments of the disclosure. The configuration, quantity, and size of each component in the embodiments are for illustrative purposes only, and are not intended to limit the disclosure. In addition, if the reference number of a component in the embodiments and the drawings appears repeatedly, it is for the purpose of simplifying the description, and does not mean to imply a relationship between different embodiments.

Certain terms are used throughout the specification and the claims of the disclosure to refer to particular components. One skilled in the art should understand that electronic device manufactures may use refer to the same components by different names. The disclosure does not intend to distinguish between components with the same function but different names.

The "including" mentioned in the entire specification and claims is an open term, so it should be interpreted as "including or comprising but not limited to".

The directional term mentioned in the text, such as "upper", "lower", "front", "rear", "left", "right", etc., is only direction with reference to the drawings. Therefore, the used directional term is used to illustrate, but not to limit the disclosure. In the drawings, each drawing shows the general characteristics of the method, structure and/or material used in a specific embodiment. However, these drawings should not be construed as defining or limiting the scope or nature covered by these embodiments. For example, for the sake of clarity, the relative size, thickness and position of each layer, region and/or structure may be reduced or enlarged.

It will be understood that when an element or layer is referred to as being "on" another element or layer, the element or layer can be directly on another element or layer or intervening elements or layers may be present. In contrast, when an element is referred to as being "directly on" another element or layer, there are no intervening elements or layers present. The terms of bonding and connecting may also include the case where two structures are moveable or two structures are fixed.

The terms "equal to" usually represent within 20% of a given value or range, or represent within 10%, 5%, 3%, 2%, 1% or 0.5% of the given value or range.

Furthermore, use of ordinal terms such as "first", "second", etc., in the specification and the claims to describe a claim element does not by itself connote and represent the claim element having any previous ordinal term, and does not represent the order of one claim element over another or the order of the manufacturing method, either. The ordinal terms are used merely as labels to distinguish one claim element having a certain name from another element having the same name.

In the disclosure, the technical features of the various embodiments may be replaced or combined with each other to complete other embodiments without being mutually exclusive.

Figure 1B:
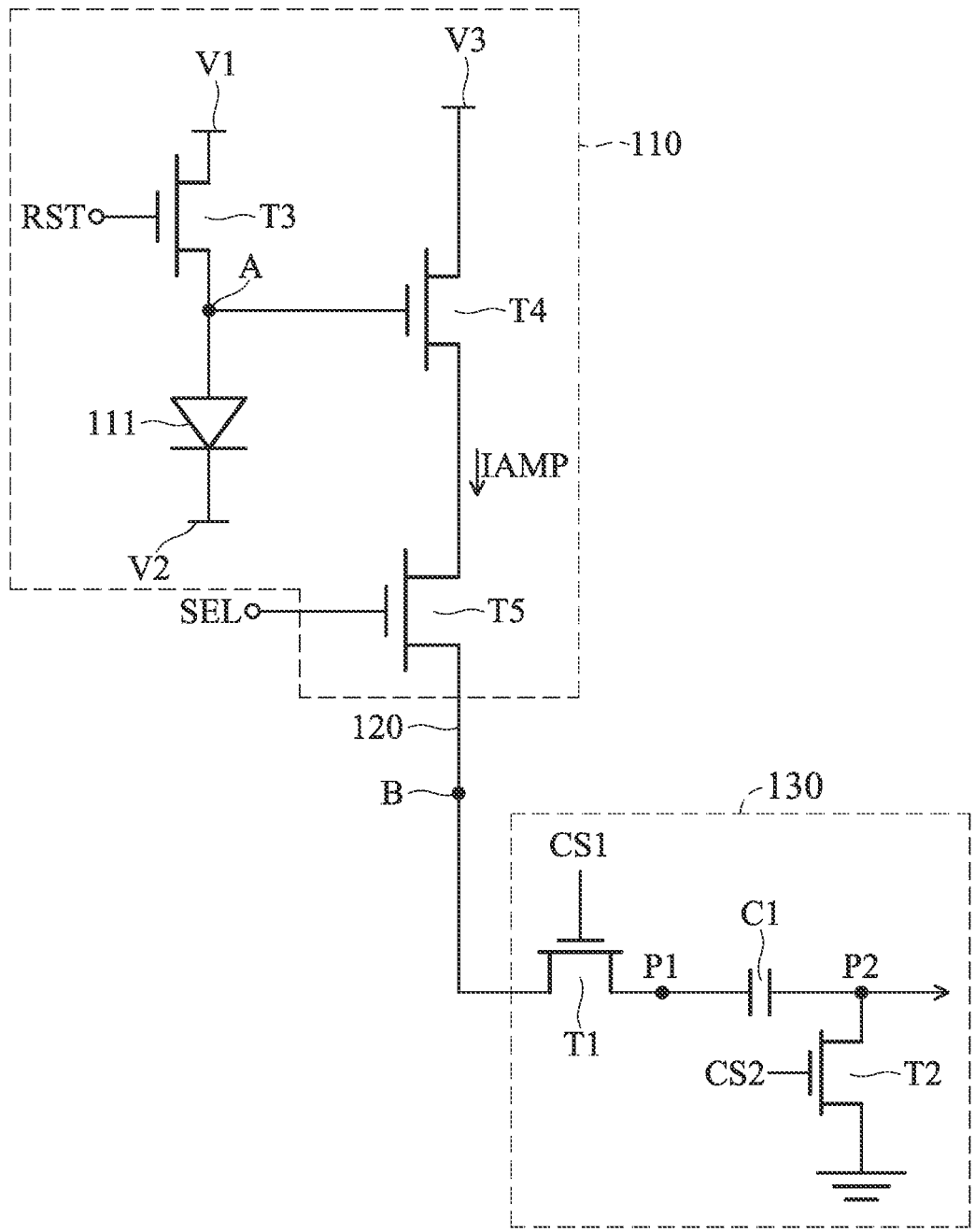
FIG. 1B is a schematic view of a sensing device according to another embodiment of the disclosure.

FIG. 1A is a schematic view of a sensing device according to an embodiment of the disclosure. FIG. 1B is a schematic view of a sensing device according to another embodiment of the disclosure. In the embodiment, the sensing device 100 may an electronic device or a display device with sensing, but the disclosure is not limited thereto. In an embodiment, the electronic device may include a display device, a backlight device, an antenna device, a sensing device or a splicing device, but the disclosure is not limited thereto. The electronic device may be a bendable or flexible electronic device. The display device may be a non-self-luminous type display device or a self-luminous type display device. The antenna device may be a liquid-crystal type antenna device or a non-liquid-crystal type antenna device, and the sensing device may be a sensing device that senses capacitance, light, heat or ultrasound, but the disclosure is not limited thereto. The electronic component may include a passive component and an active component, such as a capacitor, a resistor, an inductor, a diode, a transistor, etc. The diode may include a light-emitting diode or a photodiode. The light-emitting diode may include, for example, an organic light emitting diode (OLED), a mini LED, a micro LED or a quantum dot LED, but the disclosure is not limited thereto. The splicing device may be, for example, a display splicing device or an antenna splicing device, but the disclosure is not limited thereto. It should be noted that the electronic device may be any arrangement and combination of the above devices, but the disclosure is not limited thereto. Hereinafter, the display device will be used as an electronic device or a splicing device to illustrate to the content of the disclosure, but the disclosure is not limited thereto.

In an embodiment, the sensing device 100 may be a fingerprint recognition device, but the disclosure is not limited thereto. Please refer to FIG. 1A or FIG. 1B. The sensing device 100 may include a sensing circuit 110, a conductive line 120 and a sampling circuit 130.

The sensing circuit 110 may sense a light signal or the sensing circuit 110 may sense a change in capacitance to generate a sensing signal, but the disclosure is not limited thereto. The conductive line 120 may be electrically connected to the sensing circuit 110, and may transmit the sensing signal generated by the sensing circuit 110, but the disclosure is not limited thereto.

The sampling circuit 130 may include a capacitor C1, a first thin film transistor T1 and a second thin film transistor T2. In other embodiments, the sampling circuit 130 may include a capacitor C1 and a second thin film transistor T2. That is, the first terminal of the capacitor C1 may be directly electrically connected to the conductive line 120, but the disclosure is not limited thereto. The sampling circuit 130 referred to in this case may be, for example, a corrected double sampling (CDS) circuit, which will be described in detail later.

The first thin film transistor T1 may include a gate terminal, a first terminal and a second terminal. The gate terminal of the first thin film transistor T1 receives a first control signal CS1. The first terminal of the first thin film transistor is electrically connected to the first terminal of the capacitor C1. The second terminal of the first thin film transistor T1 is electrically connected to the conductive line 120. In the embodiment, the first thin film transistor T1 may be a N-type thin film transistor, the first terminal of the first thin film transistor T1 is, for example, a source terminal, and the second terminal of the first thin film transistor T1 is, for example, a drain terminal, but the disclosure is not limited thereto. In some embodiments, the first thin film transistor T1 may also be a P-type thin film transistor, but the disclosure is not limited thereto.

The second thin film transistor T2 may include a gate terminal, a first terminal and a second terminal. The gate terminal of the second thin film transistor T2 receives a second control signal CS2. The first terminal of the second thin film transistor T2 is electrically connected to the second terminal of the capacitor C1. The second terminal of the second thin film transistor T2 is electrically connected to a ground terminal. In the embodiment, the second thin film transistor T2 may be a N-type thin film transistor, the first terminal of the second thin film transistor T2 is, for example, a drain terminal, and the second terminal of the second thin film transistor T2 is, for example, a source terminal, but the disclosure is not limited thereto. In some embodiments, the second thin film transistor T2 may also be a P-type thin film transistor, but the disclosure is not limited thereto.

In the embodiment, the sensing circuit 110 may include a third thin film transistor T3, a sensing element 111, a fourth thin film transistor T4 and a fifth thin film transistor T5. The thin film transistor referred to in this case may include a switching transistor, a driving transistor, a reset transistor, a transistor amplifier or other suitable thin film transistors to form the sensing circuit. Specifically, according to some embodiments, the third thin film transistor T3 may be the reset transistor, the fourth thin film transistor T4 may be the transistor amplifier, and the fifth thin film transistor T5 may be the switching transistor, but the disclosure is not limited thereto.

In detail, the sensing circuit 110 may include a signal line coupled to the thin film transistor, the signal line may include, for example, a current signal line, a voltage signal line, a high-frequency signal line, and a low-frequency signal line, and the signal line may transmit an element working voltage (VDD), a common ground terminal voltage (VSS) or a driving element terminal voltage, but the disclosure is not limited thereto.

The third thin film transistor T3 may include a gate terminal, a first terminal and a second terminal. The gate terminal of the third thin film transistor T3 receives the reset signal RST. The first terminal of the third thin film transistor T3 receives a first voltage V1. In the embodiment, the third thin film transistor T3 may be a N-type thin film transistor, the first terminal of the third thin film transistor T3 is, for example, a drain terminal, the second terminal of the third thin film transistor T3 is, for example, a source terminal, but the disclosure is not limited thereto. In some embodiments, the third thin film transistor T3 may also be a P-type thin film transistor, but the disclosure is not limited thereto. In addition, in the embodiment, the first voltage V1 is, for example, a system voltage, but the disclosure is not limited thereto.

The sensing element 111 includes a first terminal and a second terminal. The first terminal of the sensing element 111 is electrically connected to the second terminal of the third thin film transistor T3 to form, for example, a node A. The second terminal of the sensing element 111 receives a second voltage V2. In the embodiment, the sensing element 111 is, for example, a photodiode, but the disclosure is not limited thereto. In some embodiments, the first terminal of the sensing element 111 is, for example, a cathode terminal, and the second terminal of the sensing element 111 is, for example, an anode terminal, as shown in FIG. 1A. In some embodiments, the first terminal of the sensing element 111 is, for example, the anode terminal, and the second terminal of the sensing element 111 is, for example, the cathode terminal, as shown in FIG. 1B. In addition, the second voltage V2 is, for example, a ground voltage, but the disclosure is not limited thereto.

The fourth thin film transistor T4 may include a gate terminal, a first terminal and a second terminal. The gate terminal of the fourth thin film transistor T4 is electrically connected to the second terminal of the third T3. The first terminal of the fourth thin film transistor T4 receives a third voltage V3. In the embodiment, the fourth thin film transistor T4 may be a N-type thin film transistor, the first terminal of the fourth thin film transistor T4 is, for example, a drain terminal, and the second terminal of the fourth thin film transistor T4, is for example, a source terminal, but the disclosure is not limited thereto. In some embodiments, the fourth thin film transistor T4 may also be a P-type thin film transistor, but the disclosure is not limited thereto. According to some embodiments, the fourth thin film transistor T4 is used to perform a signal amplifying the voltage of the node A to generate an amplified current IAMP. In addition, in the embodiment, the third voltage V3 is, for example, the system voltage, but the disclosure is not limited thereto. Furthermore, the fourth thin film transistor T4 may be used as a source follower, but the disclosure is not limited thereto.

The fifth thin film transistor T5 may include a gate terminal, a first terminal and a second terminal. The gate terminal of the fifth thin film transistor T5 receives a selecting signal SEL. The first terminal of the fifth thin film transistor T5 is electrically connected to the second terminal of the fourth thin film transistor T4. The second terminal of the fifth thin film transistor T5 is electrically connected to the conductive line 120. In the embodiment, the fifth thin film transistor T5 may be a N-type thin film transistor, the first terminal of the fifth thin film transistor T5 is, for example, a drain terminal, and the second terminal of the fifth thin film transistor T5 is, for example, a source terminal, but the disclosure is not limited thereto. In some embodiments, the fifth thin film transistor T5 may also be a P-type thin film transistor, but the disclosure is not limited thereto. When the first terminal of the fifth thin film transistor T5 is connected to the conductive line 120, the amplified current IAMP may be output to the conductive line 120. When the first terminal of the fifth thin film transistor T5 is disconnected from the conductive line 120, the amplified current IAMP is not output to the conductive line 120.

Figure 2:
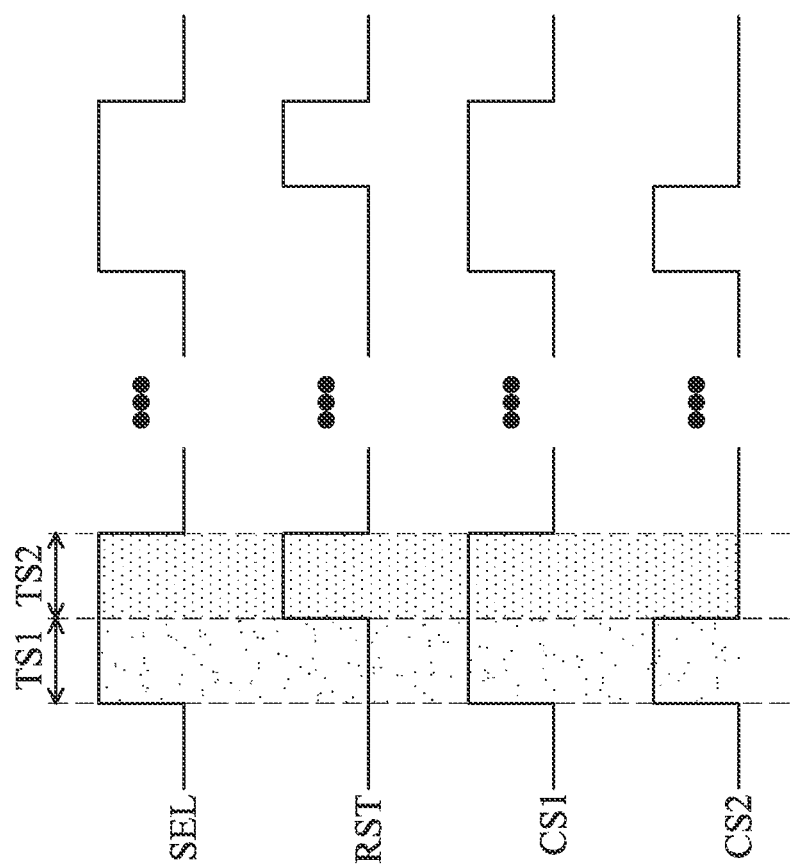
FIG. 2 is a timing diagram of an operation of a reset signal, a selecting signal, a first control signal and a second control signal according to an embodiment of the disclosure.

FIG. 2 is a timing diagram of an operation of a reset signal, a selecting signal, a first control signal and a second control signal according to an embodiment of the disclosure. In FIG. 2, a reference number "SEL" represents the selecting signal, a reference number "RST" represents the reset signal, a reference number "CS1" represents the first control signal, a reference number "CS2" represents the second control signal, a reference number "TS1" represents a light signal sampling time (such as one sampling time), and a reference number "TS2" represents a reset signal sampling time (such as a sampling time).

Please refer to FIG. 1A (or FIG. 1B) and FIG. 2. In the light signal sampling time TS1, the selecting signal SEL is, for example, at a high logic level, the reset signal RST is, for example, at a low logic level, the first control signal CS1 is, for example, at the high logic level, and the second control signal CS2 is, for example, at the high logic lever, such that the third thin film transistor T3 is turned off, and the first thin film transistor T1, the second thin film transistor T2 and the fifth thin film transistor T5 is turned on. At this time, a voltage VA of the node A may be as shown in equation (1).

$$VA = V1 - \Delta V_{photo}, \quad (1)$$

wherein VA is the voltage of the node A, V1 is the first voltage, $\Delta v_{photo}$ is a voltage difference between the first terminal and the second terminal of the sensing element 111 (such as the voltage of the sensing signal generated by the sensing element 111).

A voltage VB of a node B may be shown in equation (2).

$$VB = VA - Vth = V1 - \Delta V_{photo} - Vth = VP1, \quad (2)$$

wherein VB is a voltage of a node B, VP1 is a voltage of a node P1 (such as a voltage of the first terminal of the capacitor C1).

A charge quantity Q1 of the capacitor C1 may be calculated by equation (3), and equation (3) is as follows.

$$Q1 = Ccds * V = Ccds * (VP1 - VP2), \quad (3)$$

wherein Q1 is the charge quantity of the capacitor C1 in the light signal sampling time TS1, Ccds is a capacitance value of the capacitor C1, V is a voltage difference between the first terminal and the second terminal of the capacitor C1, VP2 is a voltage of the node P2 (such as the voltage of the second terminal of the capacitor C1).

Since the second thin film transistor T2 is turned on, the node P2 is electrically connected to the ground terminal, and the voltage VP2 of the node P2 is the ground voltage VG. Then, equation (2) and VP2=VG may be substituted into equation (3) to rewrite equation (3) into equation (4), as shown below.

$$Q1 = Ccds * ((V1 - \Delta V_{photo} - Vth) - VG), \quad (4)$$

wherein VG is the ground voltage (such as 0V).

Then, in the reset signal sampling time TS2, the selecting signal SEL is, for example, at the high logic level, the reset signal RST is, for example, at the high logic level, the first control signal CS1 is, for example, at the high logic level, and the second control signal CS2 is, for example, at the low logic level, such that the second thin film transistor T2 is turned off, and the first thin film transistor T1, the third thin film transistor T3 and the fifth thin film transistor T5 is turned on. At this time, since the third thin film transistor T3 is turned on, the node A is electrically connected to the first voltage, and the voltage VA of the node A may be as shown in equation (5).

$$VA = V1. \quad (5)$$

The voltage VB of the node VB may be as shown in equation (6).

$$VB = VA - Vth = V1 - Vth = VP1. \quad (6)$$

A charge quantity Q2 of the capacitor C1 may be calculated by equation (7), and equation (7) is as follows.

$$Q2 = Ccds * V = Ccds * (VP1 - VP2), \quad (7)$$

wherein Q2 is the charge quantity of the capacitor C1 in the reset signal sampling time TS2.

Since the second thin film transistor T2 is turned off, the voltage VP2 of the node P2 may be expressed as an unknown voltage VX. Then, equation (6) and VP2=VX may be substituted into equation (7) to rewrite equation (7) into equation (8).

$$Q2 = Ccds * (V1 - Vth - VX), \quad (8)$$

wherein VX is the voltage of the node P2 in the reset signal sampling time TS2.

Due to the charge conservation, Q1=Q2, and equation (9) may be calculated by equation (4) and equation (8), as shown below.

$$VX=\Delta V_{photo}. \qquad (9)$$

It can be seen from equation (9) that the sampling signal (i.e., VX) generated by the sampling circuit 130 is the sensing signal generated by the sensing element 111 (i.e., the sensing circuit 110). In detail, by the relationship of charge conservation, the information of the threshold voltage Vth is obtained by the charge accumulated in the capacitor C1 of the sampling circuit 130. Therefore, the sensing device 100 may effectively avoid being affected by the unevenness of the process of the sensing circuit 110, for example, avoiding the influence of the drifting of the threshold voltage Vth of the fourth thin film transistor T4 of the sensing circuit 110. That is, through the configuration of the sampling circuit 130, in addition to first subtracting the noise caused by the external environment, for example, the signal generated by the external light is first subtracted, and then the impact of the drifting of the threshold voltage is subtracted. Therefore, the sampling circuit 130 may effectively eliminate the threshold voltage Vth of the fourth thin film transistor T4 of the sensing circuit 110, so as to improve the sensing effect of the sensing device 100. According to another embodiment of the disclosure, for example, the sampling circuit 130 may effectively eliminate the information of the threshold voltage Vth of adjacent sensing circuits coupled to the same conductive line, thereby preventing the sensing device 100 from affecting the sensing effect or affecting the sensing sensitivity due to the drifting of the threshold voltage of the thin film transistor, but the disclosure is not limited thereto. The conductive line 120 of the disclosure may transmit a signal, for example, may transmit a sensing signal, and transmit the sensing signal to the sampling circuit 130, but the disclosure is not limited thereto. In some embodiments, the conductive line may be, for example, a data line in the sensing device or the electronic device, or a metal conductive line in the same layer or a different layer as the data line, but the disclosure is not limited thereto.

Figure 3A:
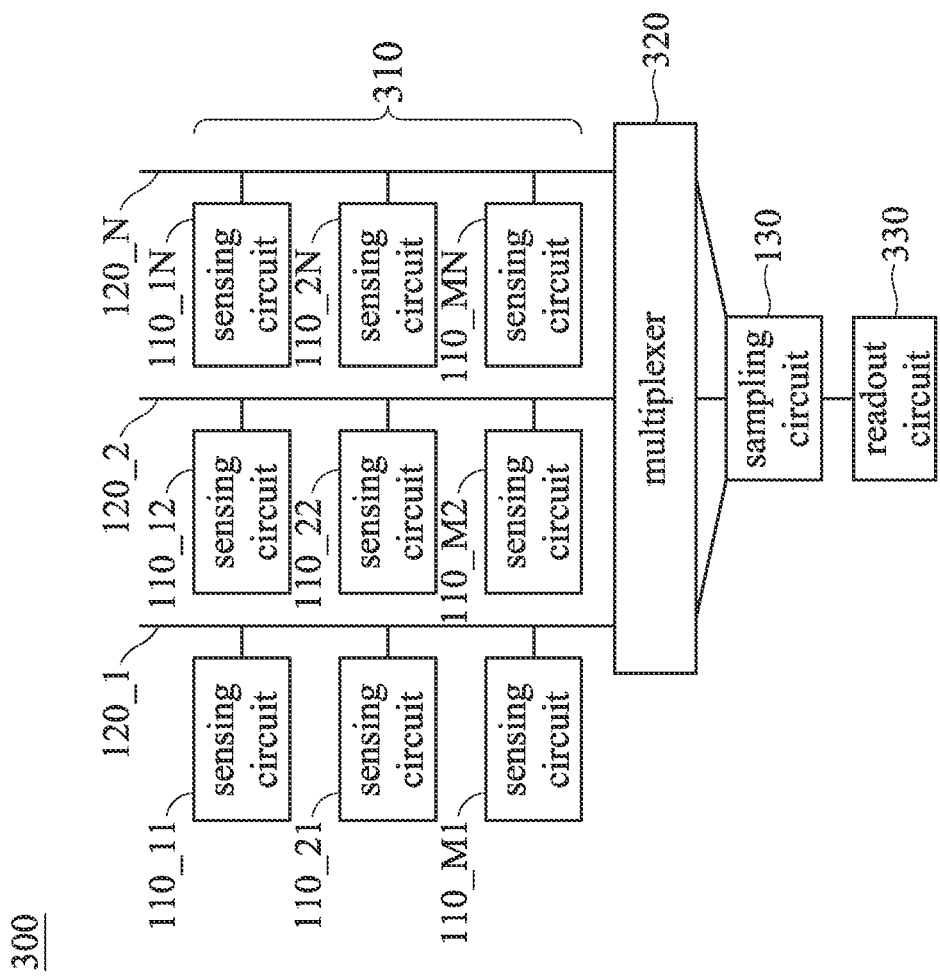
FIG. 3A is a block diagram of a sensing device according to another embodiment of the disclosure.
Figure 3B:
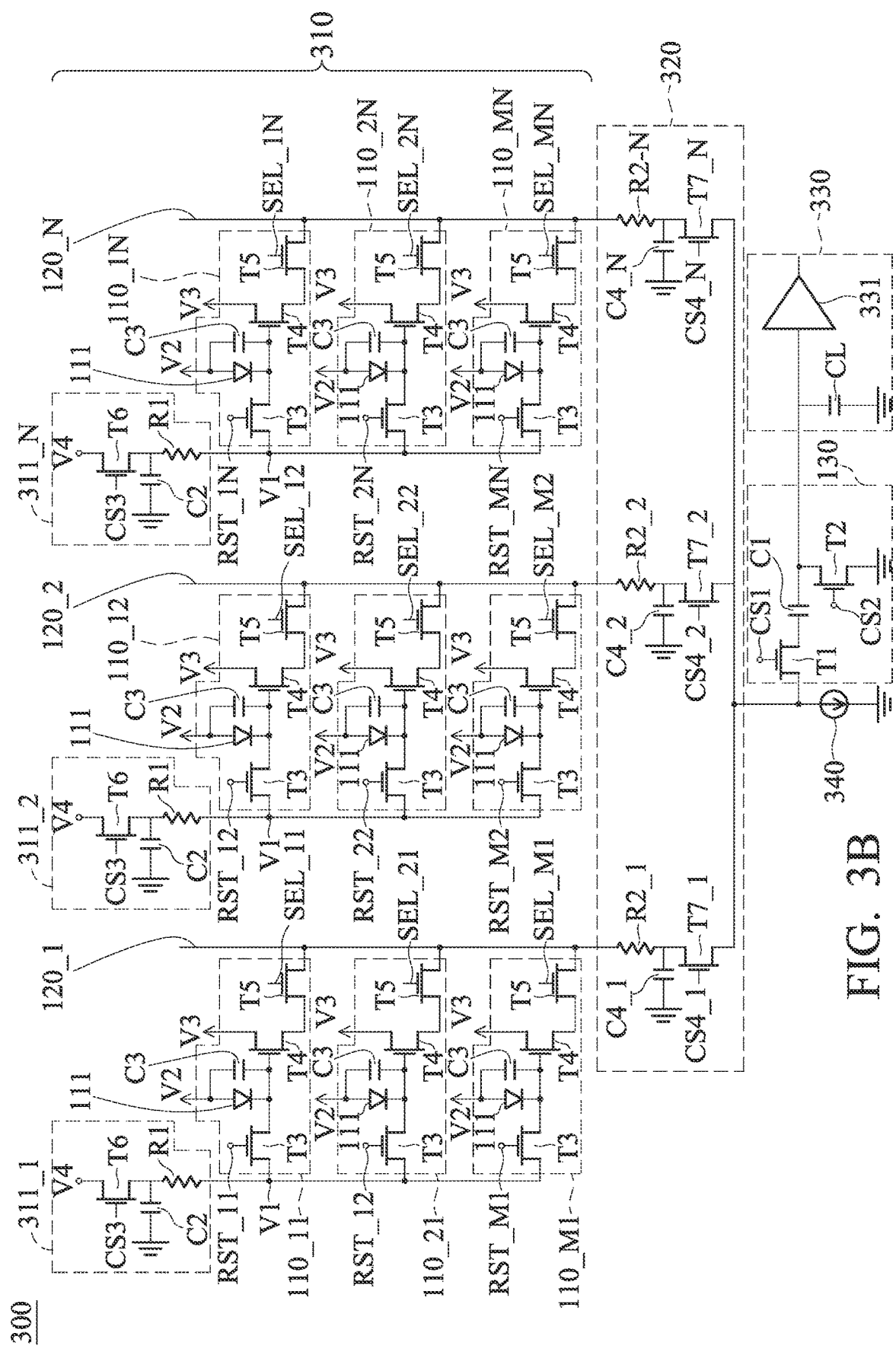
FIG. 3B is a schematic circuit diagram of the sensing device in FIG. 3A.

FIG. 3A is a block diagram of a sensing device according to another embodiment of the disclosure. FIG. 3B is a schematic circuit diagram of the sensing device in FIG. 3A. Please refer to FIG. 3A and FIG. 3B. The sensing device 300 includes a sensing circuit array 310, a multiplexer (MUX) 320, a sampling circuit 130 and a readout circuit 330.

In the embodiment, the sensing circuit array 310 may be an active pixel sensor (APS) type or a passive pixel sensor (PPS) including sensing circuits, but the disclosure is not limited thereto. The sensing circuit array 310 may include voltage sources 311_1~311_N, sensing circuits 110_11~110_MN and conductive lines 120_1~120_N, wherein M and N are positive integers greater than 0. In some embodiments, M and N may be the same or different.

Each of the voltage sources 311_1~311_N may provide the first voltage V1. In addition, each of the voltage sources 311_1~311_N includes a sixth thin film transistor T6, a capacitor C2 and a resistor R1. The sixth thin film transistor T6 may include a gate terminal, a first terminal and a second terminal. The gate terminal of the sixth thin film transistor T6 receives a third control signal CS3. The first terminal of the sixth thin film transistor T6 receives a fourth voltage V4. In the embodiment, the sixth thin film transistor T6 may be a N-type thin film transistor, the first terminal of the sixth thin film transistor T6 is, for example, a source terminal, and the second terminal of the sixth thin film transistor T6 is, for example, a drain terminal, but the disclosure is not limited thereto. In some embodiments, the sixth thin film transistor T6 may also be a P-type thin film transistor, but the disclosure is not limited thereto. In addition, in the embodiment, the fourth voltage V4 is, for example, the system voltage, but the disclosure is not limited thereto.

A first terminal of the capacitor C2 is electrically connected to the second terminal of the sixth thin film transistor T6. A second terminal of the capacitor C2 is electrically connected to the ground terminal. A first terminal of the resistor R1 is electrically connected to the second terminal of the sixth thin film transistor T6. A second terminal of the resistor R1 generates the first voltage V1.

Each of the sensing circuits 110_11~110_MN may include a third thin film transistor T3, an sensing element 111, a fourth thin film transistor T4 and a fifth thin film transistor T5. In the embodiment, gate terminals of the third thin film transistors T3 of the sensing circuits 110_11~110_MN respectively receive reset signals RST_11~RST_MN. For example, the gate terminal of the third thin film transistor T3 of the sensing circuit 110_11 receives the reset signal RST_11. The gate terminal of the third thin film transistor T3 of the sensing circuit 110_12 receives the reset signal RST_12. The gate terminal of the third thin film transistor T3 of the sensing circuit 110_MN receives the reset signal RST_MN.

Gate terminals of the fifth thin film transistors T5 of the sensing circuit 110_11~110_MN respectively receive selecting signals SEL_11~SEL_MN. For example, the gate terminal of the fifth thin film transistor T5 of the sensing circuit 110_11 receives the selecting signal SEL_11. The gate terminal of the fifth thin film transistor T5 of the sensing circuit 110_12 receives the selecting signal SEL_12. The gate terminal of the fifth thin film transistor T5 of the sensing circuit 110_MN receives the selecting signal SEL_MN.

Figure 4A:
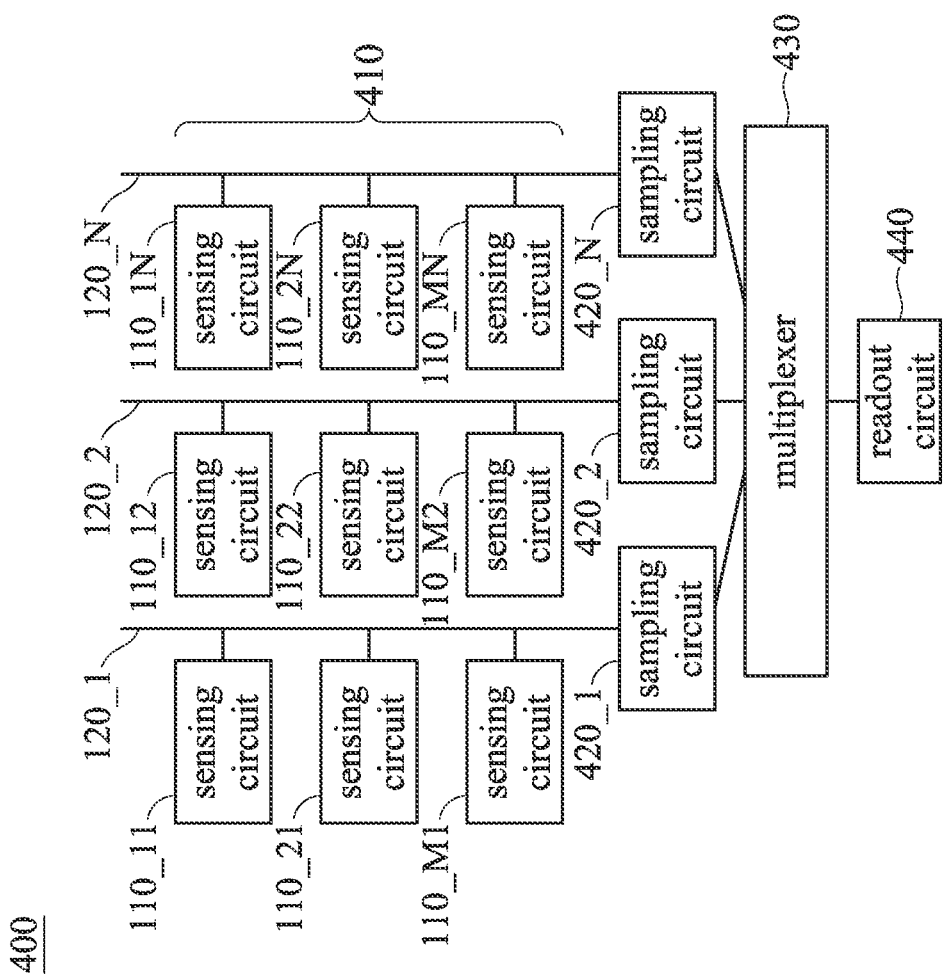
FIG. 4A is a block diagram of a sensing device according to another embodiment of the disclosure.
Figure 4B:
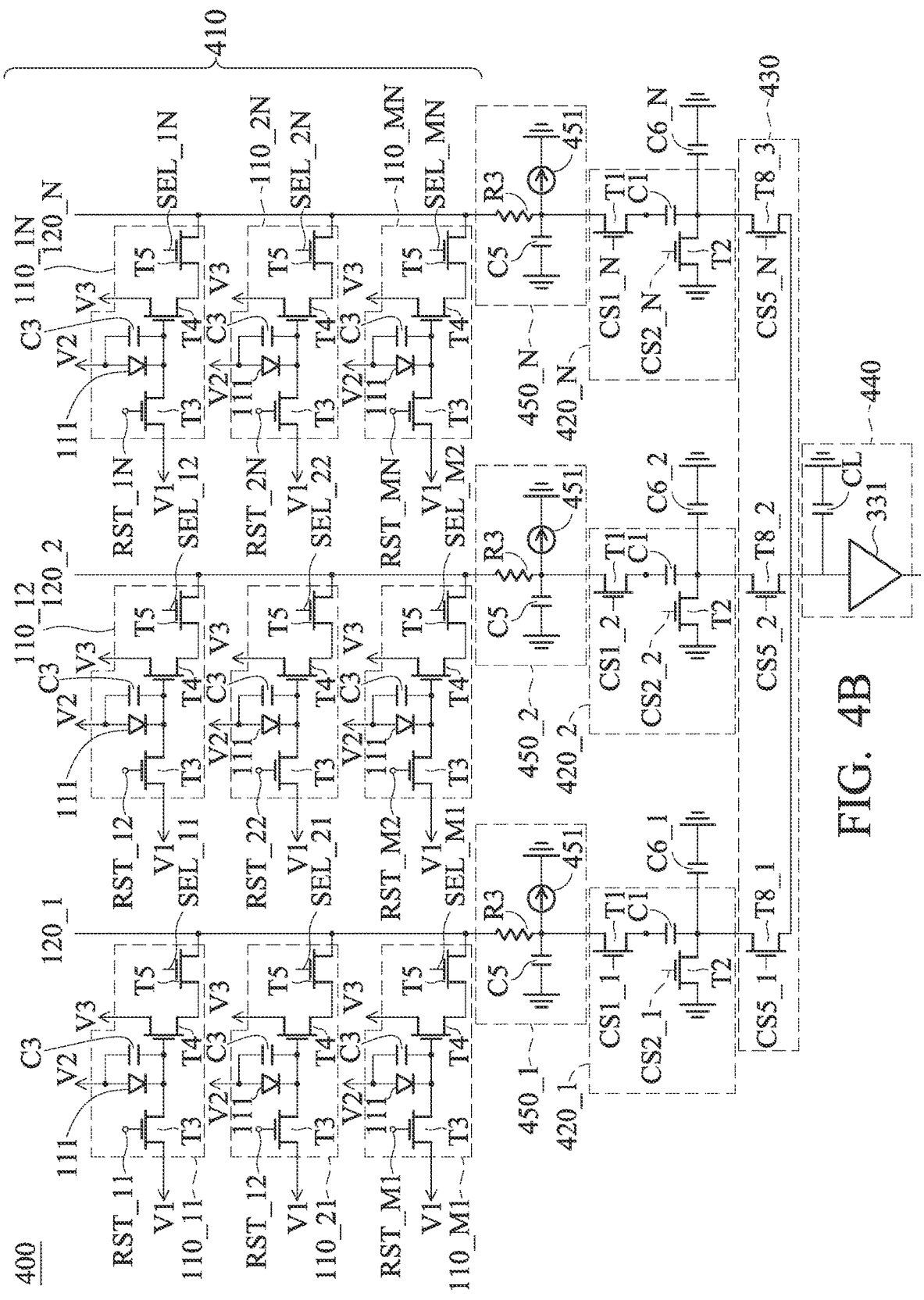
FIG. 4B is a schematic circuit diagram of the sensing device in FIG. 4A.

Furthermore, the connection manner of the third thin film transistors T3, the sensing elements 111, the fourth thin film transistors T4 and fifth thin film transistors T5 of the sensing circuits 110_11~110_MN in FIG. 4B is the same as or similar to the connection manner of the third thin film transistor T3, the sensing element 111, the fourth thin film transistor T4 and the fifth thin film transistor T5 of the sending circuit 110 in FIG. 1A. Accordingly, the connection manner of the third thin film transistors T3, the sensing elements 111, the fourth thin film transistors T4 and fifth thin film transistors T5 of the sensing circuits 110_11~110_MN in FIG. 4B may refer to the description of the embodiment of FIG. 1A, and the description thereof is not limited thereto. In other embodiments, the connection manner of the third thin film transistors T3, the sensing elements 111, the fourth thin film transistors T4 and the fifth thin film transistors T5 of the sensing circuits 110_11~110_MN in FIG. 4B may also be the same as or similar to the connection manner of the third thin film transistor T3, the sensing element 111, the fourth thin film transistor T4 and the fifth thin film transistor T5 of the sensing circuit 110 in FIG. 1B.

In addition, each of the sensing circuit 110_11~110_MN further includes a capacitor C3. Each of the capacitors C3 of the sensing circuits 110_11~110_MN is electrically connected to each of the sensing elements 111 of the sensing circuits 110_11~110_MN in parallel. That is, a first terminal of the capacitor C3 is electrically connected to the first terminal of the sensing element 111. A second terminal of the capacitor C3 is electrically connected to the second terminal of the sensing element 111.

Each of the conductive lines 120_1~120_N is correspondingly electrically connected to the sensing circuits 110_11~110_MN. For example, the conductive line 120_1 is electrically connected to the sensing circuit 110_11, the sensing circuit 110_21, . . . , and the sensing circuit 110_M1. The conductive line 120_2 is electrically connected to the sensing circuit 110_12, the sensing circuit 110_22, . . . , and the sensing circuit 110_M2 . . . . The conductive line 120_N is electrically connected to the sensing circuit 110_1N, the sensing circuit 110_2N, . . . , and the sensing circuit 110_MN.

The multiplexer 320 is electrically connected to the conductive lines 120_1~120_N. The multiplexer 320 may be electrically connected between the sensing circuit array 310 and the sampling circuit 130. The multiplexer 320 may switch a connection between the conductive lines 120_1~120_N and the sampling circuit 130.

In addition, the multiplexer 320 may include resistors R2_1~R2_N, capacitors C4_1~C4_N and seventh thin film transistors T7_1~T7_N. Each of the resistors R2_1~R2_N is electrically connected to each of the conductive lines 120_1~120_N. For example, a first terminal of the resistor R2_1 is electrically connected to the conductive line 120_1. A first terminal of the resistor R2_2 is electrically connected to the conductive line 120_2 . . . . A first terminal of the resistor R2_N is electrically connected to the conductive line 120_N.

First terminals of the capacitors C4_1~C4_N are respectively electrically connected to second terminals of the resistors R2_1~R2_N. For example, the first terminal of the capacitor C4_1 is electrically connected to the second terminal of the resistor R2_1. The first terminal of the capacitor C4_2 is electrically connected to the second terminal of the resistor R2_2 . . . . The first terminal of the capacitor C4_N is electrically connected to the second terminal of the resistor R2_N. Second terminals of the capacitors C4_1~C4_N are respectively electrically connected to ground terminals.

Each of the seventh thin film transistors T7_1~T7_N includes a gate terminal, a first terminal and a second terminal. The gate terminals of the seventh thin film transistors T7_1~T7_N respectively receive fourth control signals CS4_1~CS4_N. For example, the gate terminal of the seventh thin film transistor T7_1 receives the fourth control signal CS4_1. The gate terminal of the seventh thin film transistor T7_2 receives the fourth control signal CS4_2 . . . . The gate terminal of the seventh thin film transistor T7_N receives the fourth control signal CS4_N.

The first terminals of the seventh thin film transistors T7_1~T7_N are respectively electrically connected to the second terminals of the resistors R2_1~R2_N. For example, the first terminal of the seventh thin film transistor T7_1 is electrically connected to the second terminal of the resistor R2_1. The first terminal of the seventh thin film transistor T7_2 is electrically connected to the second terminal of the resistor R2_2 . . . . The first terminal of the seventh thin film transistor T7_N is electrically connected to the second terminal of the resistor R2_N. The second terminals of the seventh thin film transistors T7_1~T7_N are electrically connected to the sampling circuit 130. In the embodiment, each of the seventh thin film transistors T7_1~T7_N may be a N-type thin film transistor, the first terminals of the seventh thin film transistors T7_1~T7_N are, for example, drain terminals, and the second terminals of the seventh thin film transistors T7_1~T7_N are, for example, source terminals, but the disclosure is not limited thereto. In some embodiments, each of the seventh thin film transistors T7_1~T7_N may also be a P-type transistor, but the disclosure is not limited thereto.

The sampling circuit 130 may include a capacitor C1, a first thin film transistor T1 and a second thin film transistor T2. In the embodiment, the capacitor C1, the first thin film transistor T1 and the second thin film transistor T2 in FIG. 3B are the same as or similar to the capacitor C1, the first thin film transistor T1 and the second thin film transistor in FIG. 1A (or FIG. 1B). Accordingly, the capacitor C1, the first thin film transistor T1 and the second thin film transistor T2 in FIG. 3B may refer to the description of the embodiment of FIG. 1A (or FIG. 1B), and the description thereof is not repeated herein.

The readout circuit 330 may include a capacitor CL and an operation amplifier 331. A first terminal of the capacitor CL is electrically connected to the sampling circuit 130. A second terminal of the capacitor CL is electrically connected to the ground terminal. An input terminal of the operation amplifier 331 is electrically connected to the first terminal of the capacitor CL. An output terminal of the operation amplifier 331 generates a readout signal. In addition, the readout signal may be transmitted to a back-end circuit for subsequent processing.

Furthermore, the sensing device 300 further include a current source 340. A first terminal of the current source 340 is electrically connected to the multiplexer 320 and the sampling circuit 130. A second terminal of the current source 340 is electrically connected to the ground terminal.

In some embodiments, the multiplexer 320 may sequentially switch the connection between the conductive lines 120_1~120_N and the sampling circuit 130. For example, in some embodiments, when the multiplexer 320 switches the conductive line 120_1 to be connected to the sampling circuit 130, the sampling circuit 130 may, for example, sample the sensing circuit 110_11 to generate a sampling signal corresponding to the sensing circuit 110_11. Then, when the multiplexer 320 switches the conductive line 120_2 to be connected to the sampling circuit 130, the sampling circuit 130 may, for example, sample the sensing circuit 110_12 to generate a sampling signal corresponding to the sensing circuit 110_12 . . . . When the multiplexer 320 switches the conductive line 120_N to be connected to the sampling circuit 130, the sampling circuit 130 may, for example, sample the sensing circuit 110_1N to generate a sampling signal corresponding to the sensing circuit 110_12.

When the multiplexer 320 switches the conductive line 120_1 to be connected to the sampling circuit 130, the sampling circuit 130 may, for example, sample the sensing circuit 110_21 to generate a sampling signal corresponding to the sensing circuit 110_21. Then, when the multiplexer 320 switches the conductive line 120_2 to be connected to the sampling circuit 130, the sampling circuit 130 may, for example, sample the sensing circuit 110_22 to generate a sampling signal corresponding to the sensing circuit 110_22 . . . . When the multiplexer 320 switches the conductive line 120_N to be connected to the sampling circuit 130, the sampling circuit 130 may, for example, sample the sensing circuit 110_2N to generate a sampling signal corresponding to the sensing circuit 110_22. The sampling manner of the sampling circuit 130 to the other sensing circuits 110_31~110_MN is analogized.

In some embodiments, when the multiplexer 320 switches the conductive line 120_1 to be connected to the sampling circuit 130, the sampling circuit 130 may, for example, sample the sensing circuit 110_11 to generate a sampling signal corresponding to the sensing circuit 110_11. Then, the sampling circuit 130 may, for example, sample the sensing circuit 110_21 to generate a sampling signal corresponding to the sensing circuit 110_21 . . . . Then, the sampling circuit 130 may, for example, sample the sensing circuit 110_M1 to generate a sampling signal corresponding to the sensing circuit 110_M1.

Then, when the multiplexer 320 switches the conductive line 120_2 to be connected to the sampling circuit 130, the sampling circuit 130 may, for example, sample the sensing circuit 110_12 to generate a sampling signal corresponding to the sensing circuit 110_12. Then, the sampling circuit 130 may, for example, sample the sensing circuit 110_22 to generate a sampling signal corresponding to the sensing circuit 110_22 . . . . Then, the sampling circuit 130 may, for example, sample the sensing circuit 110_M2 to generate a sampling signal corresponding to the sensing circuit 110_M2. The sampling manner of the sampling circuit 130 to the other sensing circuits 110_31~110_MN is analogized.

In some embodiments, the multiplexer 320 may switch the connection between the conductive lines 120_1~120_N and the sampling circuit 130 out of order. For example, the multiplexer 320 switches the conductive line 120_1 to be connected to the sampling circuit 130. Then, the multiplexer 320 switches the conductive line 120_3 to be connected to the sampling circuit 130. Afterward, the multiplexer 320 switches the conductive line 120_5 to be connected to the sampling circuit 130. The other switching manners are analogized.

In addition, the operation of the sensing circuits 110_11~110_MN and the sampling circuit 130 in FIG. 3A and FIG. 3B may refer to the description of the embodiments in FIG. 1A (or FIG. 1B) and FIG. 2, and the description is not repeated herein.

In the embodiment, it can be seen from equation (9) that the sampling signals (i.e., VX) generated by the sampling circuit 130 may respectively be the sensing signals generated by the sensing elements 111 (i.e., the sensing circuits 110_11~110_MN). Therefore, the sensing device 300 may effectively avoid being affected by the unevenness of the process of the sensing circuits 110_11~110_MN, for example, avoiding the influence of the drifting of the threshold voltages Vth of the fourth thin film transistors T4 of the sensing circuits 110_11~110_MN. That is, the sampling circuit 130 may effectively eliminate the threshold voltages Vth of the fourth thin film transistors T4 of the sensing circuits 110_11~110_MN, such that when the sensing circuits 110_11~110_MN receive the same light intensity, the sensing circuits 110_11~110_MN may output the same voltage value, thereby improving the sensing effect of the sensing device 300.

FIG. 4A is a block diagram of a sensing device according to another embodiment of the disclosure. FIG. 4B is a schematic circuit diagram of the sensing device in FIG. 4A. The sensing device 400 includes a sensing circuit array 410, sampling circuits 420_1~420_N, a multiplexer 430 and a readout circuit 440.

In the embodiment, the sensing circuit array 410 may be an active pixel sensor (APS) type or a passive pixel sensor (PPS), but the disclosure is not limited thereto. The sensing circuit array 410 may include sensing circuit 110_11~110_MN and conductive lines 120_1~120_N, wherein M and N are positive integers greater than 0. In some embodiments, M and N may be the same or different. In the embodiment, the sensing circuits 110_11~110_MN and the conductive lines 120_1~120_N in FIG. 4A and FIG. 4B are the same as or similar to the sensing circuits 110_11~110_MN and the conductive lines 120_1~120_N in FIG. 3A and FIG. 3B. Accordingly, the sensing circuits 110_11~110_MN and the conductive lines 120_1~120_N in FIG. 4A and FIG. 4B may refer to the description of the embodiments of FIG. 3A and FIG. 3B, and the description thereof is not repeated herein.

The sampling circuits 420_1~420_N are respectively electrically connected between the sensing circuit array 410 and the multiplexer 430. In addition, the sampling circuits 420_1~420_N are respectively electrically connected to the conductive lines 120_1~120_N. For example, the sampling circuit 420_1 is electrically connected to the conductive line 120_1. The sampling circuit 420_2 is electrically connected to the conductive line 120_2 . . . . The sampling circuit 420_N is electrically connected to the conductive line 120_N.

Each of the sampling circuits 420_1~420_N may include a capacitor C1, a first thin film transistor T1 and a second thin film transistor T2. In the embodiment, gate terminals of the first thin transistors T1 of the sampling circuits 420_1~420_N may respectively receive first control signals CS1_1~CS1_N. For example, the gate terminal of the first thin film transistor T1 of the sampling circuit 420_11 receives the first control signal CS1_1. The gate terminal of the first thin film transistor T1 of the sampling circuit 420_2 receives the first control signal CS1_2. . . . The gate terminal of the first thin film transistor T1 of the sampling circuit 420_N receives the first control signal CS1_N.

Gate terminals of the second thin film transistors T2 of the sampling circuits 420_1~420_N respectively receive second control signals CS2_1~CS2_N. For example, the gate terminal of the second thin film transistor T2 of the sampling circuit 420_1 receives the second control signal CS2_1. The gate terminal of the second thin film transistor T2 of the sampling circuit 420_2 receives the second control signal CS2_2 . . . . The gate terminal of the second thin film transistor T2 of the sampling circuit 420_N receives the second control signal CS2_N.

Furthermore, the connection manner of the capacitor C1, the first thin film transistor T1 and the second thin film transistors T2 in FIG. 4B is the same as or similar to the connection manner of the capacitor C1, the first thin film transistor T1 and the second thin film transistor T2 in FIG. 1A (or FIG. 1B). Accordingly, the connection manner of the capacitor C1, the first thin film transistor T1 and the second thin film transistors T2 in FIG. 4B may refer to the description of the embodiment of FIG. 1A (or FIG. 1B), and the description thereof is not repeated herein.

The multiplexer 430 is electrically connected between the sampling circuits 420_1~420_N and the readout circuit 440. The multiplexer 430 may switch a connection between the sampling circuits 420_1~420_N and the readout circuit 440.

In addition, the multiplexer 430 may include eighth thin film transistors T8_1~T8_N. Each of the eighth thin film transistors T8_1~T8_N includes a gate terminal, a first terminal and a second terminal. The gate terminals of the eighth thin film transistors T8_1~T8_N respectively receive fifth control signals CS5_1~CS5_N. For example, the gate terminal of the eighth thin film transistor T8_1 receives the fifth control signal CS5_1. The gate terminal of the eighth thin film transistor T8_2 receives the fifth control signal CS5_2 . . . . The gate terminal of the eighth thin film transistor T8_N receives the fifth control signal CS5_N.

The first terminals of the eighth thin film transistors T8_1~T8_N are respectively electrically connected to the sampling circuits 420_1~420_N. For example, the first terminal of the eighth thin film transistor T8_1 is electrically connected to the sampling circuit 420_1. The first terminal of the eighth thin film transistor T8_2 is electrically connected to the sampling circuit 420_2 . . . . The first terminal of the eighth thin film transistor T8_N is electrically connected to the sampling circuit 420_N.

The second terminals of the eighth thin film transistors T8_1~T8_N are electrically connected to the readout circuit 440. In the embodiment, each of the eighth thin film transistors T8_1~T8_N may be a N-type thin film transistor, the first terminals of the eighth thin film transistors T8_1~T8_N are, for example, drain terminals, and the second terminals of the eighth thin film transistors T8_1~T8_N are, for example, source terminals, but the disclosure is not limited thereto. In some embodiments, each of the eighth thin film transistors T8_1~T8_N may also be a P-type thin film transistors, but the disclosure is not repeated herein.

The readout circuit 440 may include a capacitor CL and an operation amplifier 331. A first terminal of the capacitor CL is electrically connected to the multiplexer 430. A second terminal of the capacitor CL is electrically connected to the ground terminal. An input terminal of the operation amplifier 331 is electrically connected to the first terminal of the capacitor CL. An output terminal of the operation amplifier 331 generates a readout signal. In addition, the readout signal may be transmitted to a back-end circuit for subsequent processing.

The sensing device 400 may further include current source circuits 450_1~450_N and capacitors C6_1~C6_N. The current source circuits 450_1~450_N are respectively electrically connected between the conductive lines 120_1~120_N and the sampling circuits 420_1~420_N. For example, the current source circuit 450_1 is electrically connected between the conductive line 120_1 and the sampling circuit 420_1. The current source circuit 450_2 is electrically connected between the conductive line 120_2 and the sampling circuit 420_2 . . . . The current source circuit 450_N is electrically connected between the conductive line 120_N and the sampling circuit 420_1.

Each of the current source circuits 450_1~450_N includes a resistor R3, a capacitor C5 and a current source 451. First terminals of the resistors R3 of the current source circuits 450_1~450_N are respectively electrically connected to the conductive lines 120_1~120_N. The first terminal of the resistor R3 of the current source circuit 450_1 is electrically connected to the conductive line 120_1. The first terminal of the resistor R3 of the current source circuit 450_2 is electrically connected to the conductive line 120_2 . . . . The first terminal of the resistor R3 of the current source circuit 450_N is electrically connected to the conductive line 120_N. Second terminals of the resistors R3 of the current source circuits 450_1~450_N are respectively electrically connected to the sampling circuits 420_1~420_N. For example, the second terminal of the resistor R3 of the current source circuit 450_1 is electrically connected to the sampling circuit 420_1. The second terminal of the resistor R3 of the current source circuit 450_2 is electrically connected to the sampling circuit 420_2 . . . . The second terminal of the resistor R3 of the current source circuit 450_N is electrically connected to the sampling circuit 420_N.

First terminals of the capacitor C5 of the current source circuits 450_1~450_N are respectively electrically connected to the second terminals of the resistors R3 of the current source circuits 450_1~450_N. For example, the first terminal of the capacitor C5 of the current source circuit 450_1 is electrically connected to the second terminal of the resistor R3 of the current source circuit 450_1. The first terminal of the capacitor C5 of the current source circuit 450_2 is electrically connected to the second terminal of the resistor R3 of the current source circuit 450_2 . . . . The first terminal of the capacitor C5 of the current source circuit 450_N is electrically connected to the second terminal of the resistor R3 of the current source circuit 450_N. Second terminals of the capacitors C5 of the current source circuits 450_1~450_N are respectively electrically connected to the ground terminals.

First terminals of the current sources 451 of the current source circuit 450_1~450_N are respectively electrically connected to the second terminals of the resistors R3 of the current source circuits 450_1~450_N. For example, the first terminal of the current source 451 of the current source circuit 450_1 is electrically connected to the second terminal of the resistor R3 of the current source circuit 450_1. The first terminal of the current source 451 of the current source circuit 450_2 is electrically connected to the second terminal of the resistor R3 of the current source circuit 450_2 . . . . The first terminal of the current source 451 of the current source circuit 450_N is electrically connected to the second terminal of the resistor R3 of the current source circuit 450_N. Second terminals of the current sources 451 of the current source circuits 450_1_450_N are respectively electrically connected to the ground terminals.

First terminals of the capacitors C6_1~C6_N are respectively connected to the sampling circuits 420_1~420_N. For example, the first terminal of the capacitor C6_1 is electrically connected to the sampling circuit 420_1. The first terminal of the capacitor $C_{6\text{-}2}$ is electrically connected to the sampling circuit 420_2 . . . . The first terminal of the capacitor C6_N is electrically connected to the sampling circuit 420_N. Second terminals of the capacitors C6_1~C6_N are respectively electrically connected to the ground terminals.

In some embodiments, the multiplexer 430 may sequentially switch the connection between the sampling circuits 420_1~420_N and the readout circuit 440. For example, in some embodiments, when the multiplexer 430 switches the sampling circuit 420_1 to be connected to the readout circuit 440, the sampling circuit 420_1 may, for example, sample the sensing circuit 110_11 to generate a sampling signal corresponding to the sensing circuit 110_11 to the readout circuit 440. Then, when the multiplexer 430 switches the sampling circuit 420_2 to be connected to the readout circuit 440, the sampling circuit 420_2 may, for example, sample the sensing circuit 110_12 to generate a sampling signal corresponding to the sensing circuit 110_12 to the readout circuit 440 . . . . When the multiplexer 430 switches the sampling circuit 420_N to be connected to the readout circuit 440, the sampling circuit 420_N may, for example, sample the sensing circuit 110_1N to generate a sampling signal corresponding to the sensing circuit 110_12 to the readout circuit 440.

When the multiplexer 430 switches the sampling circuit 420_1 to be connected to the readout circuit 440, the sampling circuit 420_1 may, for example, sample the sensing circuit 110_21 to generate a sampling signal corresponding to the sensing circuit 110_21 to the readout circuit 440. Then, when the multiplexer 430 switches the sampling circuit 420_2 to be connected to the readout circuit 440, the sampling circuit 420_2 may, for example, sample the sensing circuit 110_22 to generate a sampling signal corresponding to the sensing circuit 110_22 to the readout circuit 440 . . . . When the multiplexer 430 switches the sampling circuit 420_N to be connected to the readout circuit 440, the sampling circuit 420_N may, for example, sample the sensing circuit 110_2N to generate a sampling signal corresponding to the sensing circuit 110_2N to the readout circuit 440. The sampling manner of the sampling circuits 420_1~420_N to the other sensing circuits 110_31~110_MN is analogized.

In some embodiments, when the multiplexer 430 switches the sampling circuit 420_1 to be connected to the readout circuit 440, the sampling circuit 420_1 may, for example, sample the sensing circuit 110_11 to generate a sampling signal corresponding to the sensing circuit 110_11 to the readout circuit 440. Then, the sampling circuit 420_1 may, for example, sample the sensing circuit 110_21 to generate a sampling signal corresponding to the sensing circuit 110_21 to the readout circuit 440 . . . . Then, the sampling circuit 420_1 may, for example, sample the sensing circuit 110_M1 to generate a sampling signal corresponding to the sensing circuit 110_M1 to the readout circuit 440.

Then, when the multiplexer 430 switches the sampling circuit 420_2 to be connected to the readout circuit 440, the sampling circuit 420_2 may, for example, sample the sensing circuit 110_12 to generate a sampling signal corresponding to the sensing circuit 110_12 to the readout circuit 440. Then, the sampling circuit 420_2 may, for example, sample the sensing circuit 110_22 to generate a sampling signal corresponding to the sensing circuit 110_22 to the readout circuit 440 . . . . Then, the sampling circuit 420_2 may, for example, sample the sensing circuit 110_M2 to generate a sampling signal corresponding to the sensing circuit 110_M2 to the readout circuit 440. The sampling manner of the sampling circuits 420_3~420_N to the other sensing circuits 110_31~110_MN is analogized.

In some embodiments, the multiplexer 430 may switch the connection between the sampling circuits 420_1~420_N and the readout circuit 440 out of order. For example, the multiplexer 430 switches the sampling circuit 420_1 to be connected to the readout circuit 440. Then, the multiplexer 430 switches the sampling circuit 420_3 to be connected to the readout circuit 440. Afterward, the multiplexer 430 switches the sampling circuit 420_5 to be connected to the readout circuit 440. The other switching manners are analogized.

In addition, the operation of the sensing circuits 110_11~110_MN and the sampling circuits 420_1~420_N in FIG. 4A and FIG. 4B may refer to the description of the embodiments in FIG. 1A (or FIG. 1B) and FIG. 2, and the description is not repeated herein.

In the embodiment, it can be seen from equation (9) the sampling signals (i.e., VX) generated by the sampling circuits 420_3~420_N may respectively be the sensing signals generated by the sensing elements 111 (i.e., the sensing circuits 110_11~110_MN). Therefore, the sensing device 400 may effectively avoid being affected by the unevenness of the process of the sensing circuits 110_11~110_MN, for example, avoiding the influence of the drifting of the threshold voltages Vth of the fourth thin film transistors T4 of the sensing circuits 110_11~110_MN. That is, the sampling circuits 420_3~420_N may respectively effectively eliminate the threshold voltages Vth of the fourth thin film transistors T4 of the sensing circuits 110_11~110_MN, such that when the sensing circuits 110_11~110_MN receive the same light intensity, the sensing circuits 110_11~110_MN may output the same voltage value, thereby improving the sensing effect of the sensing device 400.

In summary, according to the sensing device disclosed by the embodiments of the disclosure, the conductive line is electrically connected to the sensing circuit and the sampling circuit, the sampling circuit includes the capacitor, the first thin film transistor and the second thin film transistor, wherein the first terminal of the first thin film transistor is electrically connected to the first terminal of the capacitor, the first terminal of the second thin film transistor is electrically connected to the second terminal of the capacitor, the second terminal of the first thin film transistor is electrically connected to the conductive line, and the second terminal of the second thin film transistor is electrically connected to the ground terminal. Therefore, the design of fabricating the sampling circuit and the sensing circuit on the same substrate may be realized, or the sensing effect of the sensing device may be improved, or the influence of the sensing device being affected by the unevenness of the process of the sensing circuits may be decreased. The above substrate may be, for example, a soft substrate or a hard substrate, the soft substrate may be, for example a polyimide film (PI) substrate, and the hard substrate may be, for example a glass, but the disclosure is not limited thereto.

In addition, the disclosure further include the sensing circuit array including a plurality of sensing circuits, the sampling circuit and the multiplexer, wherein the multiplexer is electrically between the sensing circuit array and the sampling circuit. Therefore, the influence of the sensing device being affected by the unevenness of the process of the sensing circuits of the sensing circuit array may be decreased, or the number of sampling circuits fabricated on the glass substrate may be decreased to achieve the purpose of saving space. Furthermore, the disclosure further includes the sensing circuit array including a plurality of sensing circuits, the sampling circuits and the multiplexer, wherein the sampling circuits are electrically between the sensing circuit array and the multiplexer. Therefore, the influence of the sensing device being affected by the unevenness of the process of the sensing circuits of the sensing circuit array may be decreased.

While the disclosure has been described by way of examples and in terms of the preferred embodiments, it should be understood that the disclosure is not limited to the disclosed embodiments. On the contrary, it is intended to cover various modifications, combinations, and similar arrangements (as would be apparent to those skilled in the art). Therefore, the scope of the appended claims should be accorded the broadest interpretation to encompass all such modifications, combinations, and similar arrangements.

What is claimed is:

1. A sensing device, comprising:
   a sensing circuit;
   a conductive line, electrically connected to the sensing circuit; and
   a sampling circuit, electrically connected to the conductive line, wherein the sampling circuit comprises a first capacitor, a first thin film transistor, and a second thin film transistor, a first terminal of the first thin film transistor is electrically connected to a first terminal of the first capacitor, a first terminal of the second thin film transistor is electrically connected to a second terminal of the first capacitor, a second terminal of the first thin film transistor is electrically connected to the conductive line, and a second terminal of the second thin film transistor is electrically connected to a ground terminal;
   wherein the sensing circuit comprises:
   a third thin film transistor, wherein a first terminal of the third thin film transistor receives a first voltage;
   a sensing element, wherein a first terminal of the sensing element is electrically connected to a second terminal of the third thin film transistor, and a second terminal of the sensing element receives a second voltage;
   a fourth thin film transistor, wherein a gate terminal of the fourth thin film transistor is electrically connected to the second terminal of the third thin film transistor, and a first terminal of the fourth thin film transistor receives a third voltage; and a fifth thin film transistor, wherein a first terminal of the fifth thin film transistor is electrically connected to a second terminal of the fourth thin film transistor, and a second terminal of the fifth thin film transistor is electrically connected to the conductive line.

2. The sensing device according to claim 1, wherein the sensing device is a fingerprint recognition device.

3. The sensing device according to claim 1, wherein a voltage of the first terminal of the first capacitor is V1—$\Delta V_{photo}$—Vth, wherein V1 is the first voltage, $\Delta V_{photo}$ is a voltage difference between the first terminal and the second terminal of the sensing element, and Vth is a threshold voltage of the fifth thin film transistor.

4. The sensing device according to claim 1, wherein a voltage of the first terminal of the first capacitor is V1—Vth, wherein V1 is the first voltage, and Vth is a threshold voltage of the fifth thin film transistor.

5. The sensing device according to claim 1, wherein a voltage of the second terminal of the first capacitor is a voltage of a sensing signal generated by the sensing element.

6. The sensing device according to claim 1, further comprising:
a voltage source, wherein the voltage source is electrically connected to the sensing circuit and generates the first voltage.

7. The sensing device according to claim 6, wherein the voltage source comprises:
a sixth thin film transistor, wherein a first terminal of the sixth thin film transistor receives a fourth voltage;
a second capacitor, wherein a first terminal of the second capacitor is electrically connected to a second terminal of the sixth thin film transistor, and a second terminal of the second capacitor is electrically connected to the ground terminal; and
a first resistor, wherein a first terminal of the resistor is electrically connected to the second terminal of the sixth thin film transistor, and a second terminal of the resistor generates the first voltage.

8. The sensing device according to claim 1, wherein a gate terminal of the third thin film transistor receives a reset signal, and a gate terminal of the fifth thin film transistor receives a selecting signal.

9. The sensing device according to claim 1, wherein a gate terminal of the first thin film transistor receives a first control signal, and a gate terminal of the second thin film transistor receives a second control signal.

10. The sensing device according to claim 1, further comprising a multiplexer, and the multiplexer is electrically connected between the sensing circuit and the sampling circuit.

11. The sensing device according to claim 10, wherein the multiplexer comprises:
a second resistor, wherein a first terminal of the second resistor is electrically connected to the conductive line;
a third capacitor, wherein a first terminal of the third capacitor is electrically connected to a second terminal of the second resistor, and a second terminal of the third capacitor is electrically connected to ground terminal; and
a seventh thin film transistor, wherein a first terminal of the seventh thin film transistor is electrically connected to the second terminal of the second resistor, and a second terminal of the seventh thin film transistor is electrically connected to the sampling circuit.

12. The sensing device according to claim 10, further comprising a readout circuit, and the readout circuit is electrically connected to the sampling circuit.

13. The sensing device according to claim 12, wherein the readout circuit comprises:
a fourth capacitor, wherein a first terminal of the fourth capacitor is electrically connected to the sampling circuit, and a second terminal of the fourth capacitor is electrically connected to the ground terminal; and
a first operation amplifier, wherein an input terminal of the first operation amplifier is electrically connected to the first terminal of the fourth capacitor, and an output terminal of the first operation amplifier generates a readout signal.

14. The sensing device according to claim 1, further comprising a multiplexer, and the sampling circuit is electrically connected between the sensing circuit and the multiplexer.

15. The sensing device according to claim 14, further comprising a readout circuit, and the readout circuit is electrically connected to the multiplexer.

16. The sensing device according to claim 15, wherein the multiplexer comprises:
an eighth thin film transistor, wherein a first terminal of the eighth thin film transistor is electrically connected to the sampling circuit, and a second terminal of the eighth thin film transistor is electrically connected to the readout circuit.

17. The sensing device according to claim 15, wherein the readout circuit comprises:
a fifth capacitor, wherein a first terminal of the fifth capacitor is electrically connected to the sampling circuit, and a second terminal of the fifth capacitor is electrically connected to the ground terminal; and
a second operation amplifier, wherein an input terminal of the second operation amplifier is electrically connected to the first terminal of the fifth capacitor, and an output terminal of the second operation amplifier generates a readout signal.

18. The sensing device according to claim 1, further comprising:
a current source circuit, wherein the current source circuit is electrically connected between the conductive line and the sampling circuit.

19. The sensing device according to claim 18, wherein the current source circuit comprises:
a third resistor, wherein a first terminal of the third resistor is electrically connected to the conductive line, and a second terminal of the third resistor is electrically connected to the sampling circuit;
a sixth capacitor, wherein a first terminal of the sixth capacitor is electrically connected to the second terminal of the third resistor, and the second terminal of the sixth capacitor is electrically connected to the ground terminal; and
a current source, wherein a first terminal of the current source is electrically connected to the second terminal of the third resistor, and a second terminal of the current source is electrically connected to the ground terminal.

* * * * *